United States Patent
Holzbach (10) Patent No.: US 7,558,421 B1
(45) Date of Patent: Jul. 7, 2009

(54) DISTORTION CORRECTING RENDERING TECHNIQUES FOR AUTOSTEREOSCOPIC DISPLAYS

(75) Inventor: Mark E. Holzbach, Austin, TX (US)

(73) Assignee: Zebra Imaging, Inc., Austin, TX (US)

( * ) Notice: Subject to any disclaimer, the term of this patent is extended or adjusted under 35 U.S.C. 154(b) by 409 days.

(21) Appl. No.: 11/430,080

(22) Filed: May 8, 2006

Related U.S. Application Data (63) Continuation of application No. 10/251,931, filed on Sep. 20, 2002, now Pat. No. 7,043,073, which is a continuation-in-part of application No. 10/036,814, filed on Oct. 19, 2001, now Pat. No. 6,868,177.

(51) Int. Cl.
*G06K 9/00* (2006.01)

(52) U.S. Cl. .................. 382/154; 348/40; 345/418; 359/6; 359/9

(58) Field of Classification Search ............ 382/154, 382/151; 359/9, 15, 35, 16, 23, 22, 25, 32, 359/900, 10, 24, 29, 30, 21, 26, 31, 34, 630, 359/8, 6; 348/40, 46, 59, 48; 345/418, 420, 345/427, 419; 430/1; 705/26

See application file for complete search history.

(56) References Cited

U.S. PATENT DOCUMENTS

| 4,834,476 | A | 5/1989 | Benton | 359/23 |
| 5,825,363 | A | 10/1998 | Anderson | 345/422 |
| 6,009,188 | A | 12/1999 | Cohen et al. | 382/154 |
| 6,366,370 | B1 | 4/2002 | Holzbach et al. | 359/23 |
| 6,549,308 | B1 | 4/2003 | Camahort | 359/9 |
| 6,836,286 | B1 | 12/2004 | Tachi et al. | 348/36 |
| 6,930,811 | B2 | 8/2005 | Brotherton-Ratcliffe et al. | 359/22 |
| 7,043,073 | B1 * | 5/2006 | Holzbach | 382/154 |
| 2004/0050280 | A1 | 3/2004 | Rodin et al. | 101/494 |

OTHER PUBLICATIONS

Halle, Michael W. and Kropp, Adam B., "Fast Computer Graphics Rendering for Full Parallax Spatial Displays," *Practical Holography XI*, Proc. SPIE, vol. 3011, pp. 105-112, Feb. 10-11, 1997.

Halle, Michael W., "The Generalized Holographic Stereogram," submitted to the Massachusetts Institute of Technology, Media Arts and Sciences Section, © Feb. 1991, Massachusetts Institute of Technology, (last updated Feb. 24, 1993), pp. 1-134.

\* cited by examiner

*Primary Examiner*—Sheela C Chawan
(74) *Attorney, Agent, or Firm*—Campbell Stephenson LLP (57) ABSTRACT

Characterization of hologram elements (hogels) produced using specially designed test pattern images provides more accurate information that can be used to render images for use in hogel production. Once a test pattern is selected, one or more hogels are recorded in a holographic recording material using a spatial light modulator displaying the test pattern image. Recorded hogels can then be played back to produce an image of the test pattern. Characterization of this image yields information that is used to select angles used to render oblique parallel projections of a computer graphics scene. The rendered projections are then used to record hogels that will produce images with reduced distortion.

22 Claims, 6 Drawing Sheets

DISTORTION CORRECTING RENDERING TECHNIQUES FOR AUTOSTEREOSCOPIC DISPLAYS

This application is a continuation of U.S. patent application Ser. No. 10/251,931, entitled "Distortion Correcting Rendering Techniques For Autostereoscopic Displays." filed Sep. 20, 2002 now U.S. Pat. No. 7,043,073, and naming Mark E. Holzbach as the inventor; which in turn is a continuation-in-part of, and claims the benefit of priority based on, U.S. patent application Ser. No. 10/036,814, entitled "Efficient Block Transform Including Pre-Processing and Post-Processing," filed Oct. 19, 2001 now U.S. Pat. No. 6,868,177, and naming Emilio Camahort, Mark E. Holzbach, and Robert L. Sitton as inventors ("the '814 application"). The above-referenced applications are hereby incorporated by reference herein in their entirety.

FIELD OF THE INVENTION

The present invention relates in general to the field of hologram production and, more particularly, processing image data for use in the production of holographic stereograms.

BACKGROUND OF THE INVENTION

One-step hologram (including holographic stereogram) production technology has been used to satisfactorily record holograms in holographic recording materials without the traditional step of creating preliminary holograms. Both computer image holograms and non-computer image holograms may be produced by such one-step technology. In some one-step systems, computer processed images of objects or computer models of objects allow the respective system to build a hologram from a number of contiguous, small, elemental pieces known as hologram elements or hogels. To record each hogel on holographic recording material, an object beam is conditioned through the rendered image and interfered with by a reference beam. A number of hogels recorded together on the same piece of holographic recording material is often referred to as a tile. Examples of techniques for one-step hologram production can be found in the U.S. Pat. No. 6,330,088 entitled "Method and Apparatus for Recording One-Step, Full-Color, Full-Parallax, Holographic Stereograms," Ser. No. 09/098,581, naming Michael A. Klug, Mark E. Holzbach, and Alejandro J. Ferdman as inventors, and filed on Jun. 17, 1998 ("the '088 patent"), which is hereby incorporated by reference herein in its entirety. Two-step holograms are created using indirect or transfer methods, that require recording a transfer hologram before recording the master hologram.

Figure 1A:
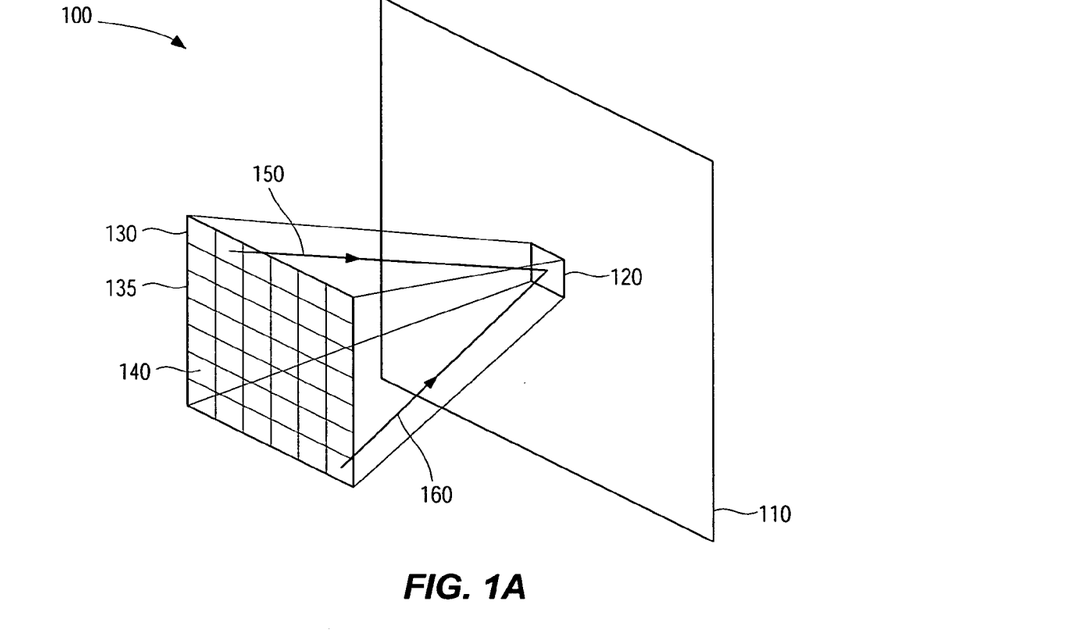
FIGS. 1A and 1B illustrate the relationship between a hogel and the computer graphics image used to create the hogel, the relationship among certain parts of a system for producing holograms, and play-back of a hogel.

FIG. 1A illustrates the relationship between a hogel 120 and the computer graphics image 130 used to create the hogel (this relationship is similar to the relationship among hologram recorder components such as a spatial light modulator and holographic recording material, as discussed below). The computer graphics image 130 is made up of a number of pixels 140 each of which can have data values depending on, for example, color and intensity. Each of the pixels 140 can define a directional image sample through the hologram. As illustrated by arrows 150 and 160, the relative position of each pixel 140 with respect to hogel 120 can be used to define directions in which a three-dimensional (3D) computer graphics scene can be viewed and/or rendered.

Similarly, two elements of a hologram production system 100 are shown in FIG. 1. Spatial light modulator (SLM) 135 includes a number of pixels 140 upon which a computer graphics image can be displayed. An object beam (not shown) passes through spatial light modulator 135, which modifies the intensity of the object beam according to values of the various pixels 140. This object beam typically passes through optics (not shown) so that when the object beam reaches tile 110, it can be used in conjunction with a reference beam to form an interference pattern which is recorded as hogel 120.

Figure 1B:
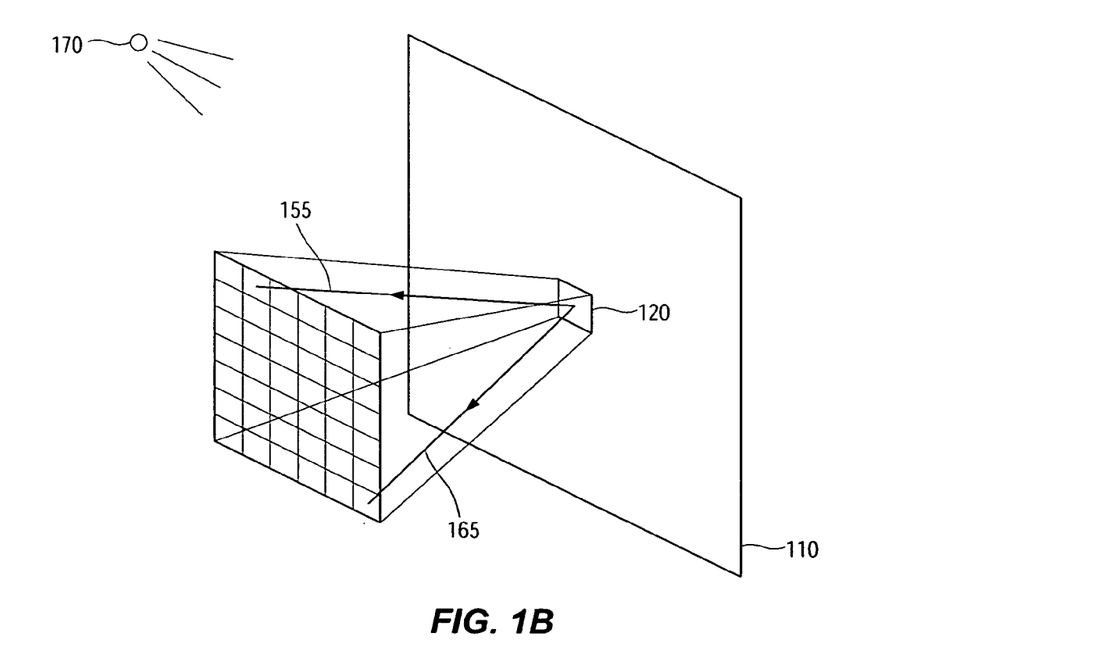

FIG. 1B illustrates a the displaying of or "playback" of hogel 120. Light source 170 illuminates tile 110 causing the diffraction pattern recorded in hogel 120 to diffract the incident light as diffracted rays 155 and 165. The light diffracted by hogel 120 produces image 180.

Distortion associated with the generation of hogels for horizontal-parallax-only (HPO) holographic stereograms is analyzed Michael W. Halle in *The Generalized Holographic Stereogram*, Master's Thesis, Massachusetts Institute of Technology, February 1991, which is hereby incorporated by reference herein in its entirety. In general for HPO holographic stereograms, the best viewer location where a viewer of a holographic stereogram can see an undistorted image is at the distance where the camera (or the camera model in the case of computer graphics images) captured the scene. This is an undesirable constraint on the viewability of holographic stereograms. Using several different techniques, one can compensate for the distortion introduced when the viewer is not at the same distance with respect to the hologram as the camera. However, the geometry of both image creation/capture and the recording process means that such distortion compensation typically implies a single preferred viewing distance.

An anamorphic physical camera can be created with a standard spherical-surfaced lens coupled with a cylindrical lens, or alternately two crossed cylindrical lenses can be used. Using these optics, one can independently adjust horizontal and vertical angles used in acquiring the stereogram images, thereby avoiding distortion. Such physical systems are typically large, expensive devices that can require constant readjustment throughout the hologram production process. For these and other reasons, anamorphic optics are typically used to correct for distortion in holographic stereogram production, rather than in image acquisition.

Since the source of the images used for producing a holographic stereogram are typically rendered computer graphics images (or digital photographs), correcting the distortion as part of the image generation process is a common technique. For example, if the computer graphics images being rendered can be rendered as if seen through the aforementioned physical optics (e.g., using ray tracing where the computer graphics model includes the optics between the scene and the computer graphics camera), then hogel images that account for distortion can be directly rendered. However, such an application of ray tracing is currently impractical given the speed of software ray-tracers, the expense of hardware ray-tracers, and the size of the data sets typically involved in holographic stereogram production.

Another technique for rendering hogel images that are "pre-distorted" is described in M. Halle and A. Kropp, "Fast Computer Graphics Rendering for Full Parallax Spatial Displays," *Practical Holography XI*, Proc. SPIE, vol. 3011, pages 105-112, Feb. 10-11, 1997, which is hereby incorporated by reference herein in its entirety. While useful for its speed, the techniques of Halle and Kropp often introduce additional (and undesirable) rendering artifacts and are susceptible to problems associated with aliasing. Improvements upon the techniques of Halle and Kropp are discussed in the U.S. patent entitled "Rendering Methods For Full Parallax Autosteroscopic Displays," Ser. No. 09/474,361, naming Mark E. Holzbach and David Chen as inventors, and filed on Dec. 29, 1999, which is hereby incorporated by reference herein in its entirety.

Still another technique for rendering hogel images utilizes a computer graphics camera whose horizontal perspective (in the case of horizontal-parallax-only (HPO) and full parallax holographic stereograms) and vertical perspective (in the case for full parallax holographic stereograms) are positioned at infinity. Consequently, the images rendered are parallel oblique projections of the computer graphics scene, i.e., each image is formed from one set of parallel rays that correspond to one "direction". If such images are rendered for each of (or more than) the directions that a hologram recorder is capable of recording, then the complete set of images includes all of the image data necessary to assemble all of the hogels. Note that in some cases, e.g., because of resolution or speed concerns, it may be desirable to render images for fewer than the number of directions that a hologram recorder is capable of recording. Additionally, when the depth of a scene is relatively shallow it may also be desirable to render fewer directional images than a hologram recorder is capable of recording—because in that case a lower number of directions may be sufficient, i.e., rendering more directions would not yield any improvement or noticeable effect in the final display.

Returning to FIG. 1A as an example, if each line between the center of each pixel 140 and the center of hogel 120 defines a direction (e.g., directions 150 and 160), then parallel oblique projections can be rendered (using image-based rendering or other techniques) for each direction. Each image resulting from the rendering represents a single direction, and includes a data value (e.g. a pixel intensity) for each hogel in tile 110. Consequently, the information needed to record any one hogel is distributed across a number of images. For example, the first pixel value of the first hogel of the tile is in the first image, the second pixel value for the first hogel is in the second image, the third pixel value for the first hogel is in the third image, and so on. Thus, image data must be rearranged to form hogels. Some techniques for rearranging or reparameterizing such data are described in the aforementioned master's thesis *The Generalized Holographic Stereogram*. Other techniques are described in the aforementioned '814 application.

Figure 2:
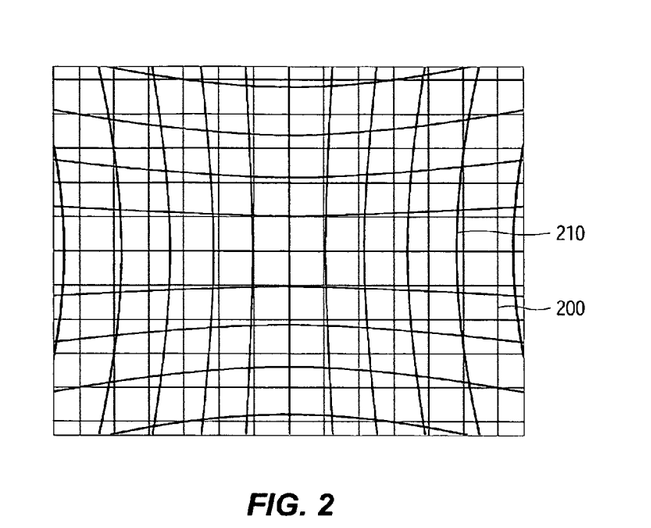
FIG. 2 illustrates distortion that can occur during the production of holographic stereograms.

The examples of FIGS. 1A and 1B assume that the rendering, recording, and displaying directions (as illustrated by 150, 155, 160, and 165) can be defined based on a simple geometric relationship between the pixels 140 of spatial light modulator 135 and the recording surface. However in practice, it has been observed that despite careful attention to rendering and recording in these directions, the holograms created can still exhibit various types of distortion. One example of that distortion is illustrated in FIG. 2. Regular grid 200 is shown in FIG. 2 and represents the desired image to be recorded in a hogel. Consequently, a computer graphics image of regular grid 200 is used as the image provided to a spatial light modulator that is part of a hogel recording system. Distorted grid 210, in this case illustrating pin-cushion distortion, is the resulting image upon play-back of the hogel based on regular grid 200. Thus, despite rendering the image of regular grid 200 according to directions defined by the relationship between SLM pixels and the recording surface, the play-back image is distorted. Unfortunately, the sources of distortion can be numerous and difficult to characterize, e.g., differences between the actual geometry of the hologram recorder and the model of FIG. 1A, optical elements located between the SLM and the recording material, recording material processing effects (e.g., material shrinkage), and display issues (e.g., location and type of light source, mounting of the hologram).

Additionally, the geometry of production systems, e.g., hologram recording devices, is typically much more fixed or constrained, and thus less adjustable, than computer based image acquisition systems. Consequently, it is generally more desirable to compensate for the problems described above at the acquisition stage rather than at a stage where hogels are recorded in a holographic recording material.

Accordingly, it is desirable to have image processing and hologram recording techniques that reduce or eliminate such distortions as part of the production of holographic stereograms.

SUMMARY OF THE INVENTION

It has been discovered that characterization of hogels produced using specially designed test pattern images provides more accurate information that can be used to render images for use in hogel production. Once a test pattern is selected, one or more hogels are recorded in a holographic recording material using a spatial light modulator displaying the test pattern image. Recorded hogels can then be played back to produce an image of the test pattern. Characterization of this image yields information that is used to select angles used to render oblique parallel projections of a computer graphics scene. The rendered projections are then used to record hogels that will produce images with reduced distortion. These techniques advantageously allow for distortion correction/avoidance without adding additional rendering steps.

Accordingly, one aspect of the present invention provides a method. At least one direction in a computer graphics model is selected. The at least one direction is based on information derived from a test image. At least one computer graphics image is rendered. The computer graphics image is a parallel projection of a computer graphics scene and the parallel projection is determined by the at least one direction.

In another aspect of the present invention, an apparatus includes a processor, a storage medium coupled to the processor, a memory coupled to the processor, and a computer program for rendering at least one computer graphics image. The storage medium coupled to the processor is operable to store at least one computer graphics image. The computer graphics image is a parallel projection of a computer graphics scene. The computer program determines the parallel projection by using at least one direction in a computer graphics model, the at least one direction being based on information derived from a test image.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

A more complete understanding of the present invention and advantages thereof may be acquired by referring to the following description and the accompanying drawings, in which like reference numbers indicate like features.

DETAILED DESCRIPTION

The following sets forth a detailed description of at least the best contemplated mode for carrying out the one or more devices and/or processes described herein. The description is intended to be illustrative and should not be taken to be limiting.

Figure 3A:
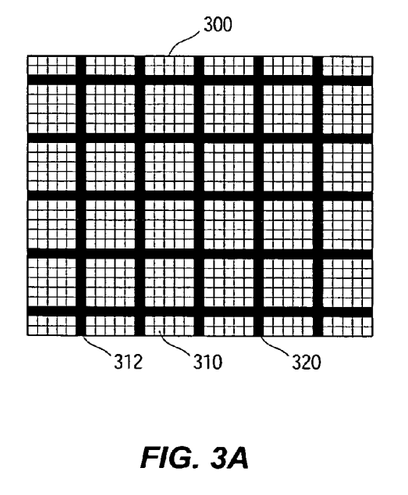
FIGS. 3A and 3B illustrate a test pattern and the resulting image used among the techniques of the present invention.

FIG. 3A illustrates a computer graphics image test pattern 320 as displayed on a spatial light modulator 300. In general, the test pattern image 320 and the spatial light modulator 300 used to display image 320 include numerous pixels 310. As will be seen below, a variety of different test patterns can be used. A regular grid pattern such as test pattern 320 is particularly useful in some examples because the affects of many types of distortion on regular grids are relatively easy to characterize. For example, mathematical expressions for two common types of optical distortion, pin-cushion distortion and barrel distortion, are well known to those having ordinary skill in the art.

Test pattern image 320 is used to record one or more hogels using any of a number of hologram recording techniques including, for example, the techniques disclosed in the aforementioned '088 patent. In the simplest example, an object beam passes through spatial light modulator 300 which modifies the intensity of the object beam according to values of the various pixels displayed. The object beam typically passes through additional optics so that when the object beam reaches a holographic recording material it can be used in conjunction with a reference beam to form an interference pattern which is recorded as a hogel.

Figure 3B:
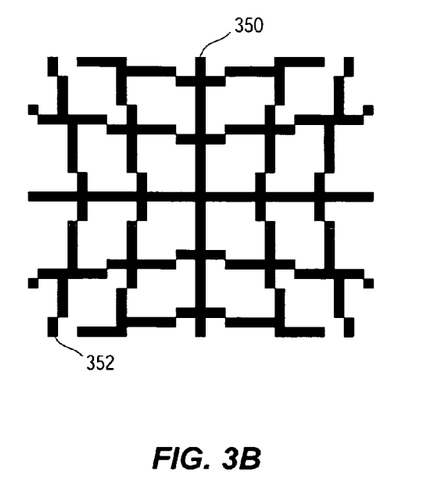

FIG. 3B illustrates the image 350 created when playing-back the hogel formed using test pattern 320. As seen in the figure, image 350 exhibits pincushion distortion. So, for example, pixel 312 of test pattern image 320 as displayed on SLM 300 leads to an image where pixel 352 is displayed. In some cases, the distorted image pixels may not precisely correspond to pixels on the SLM. For example, pixel 352 might straddle two or more SLM pixels. As noted above, a variety of different factors can lead to the illustrated image distortion.

Figure 4:
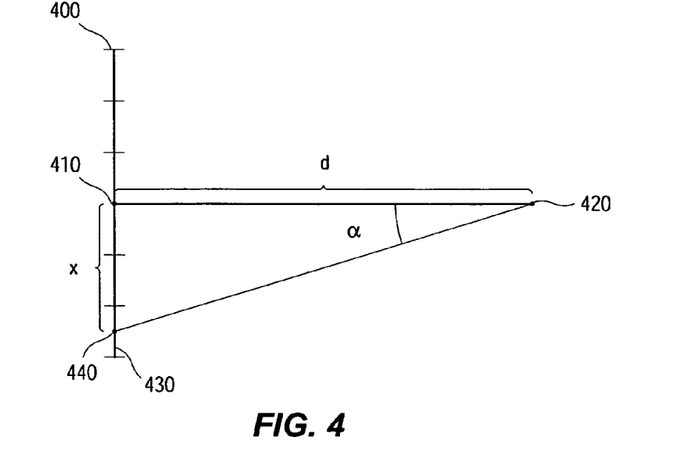
FIG. 4 illustrates a simple method for characterizing a resulting image.
Figure 5A:
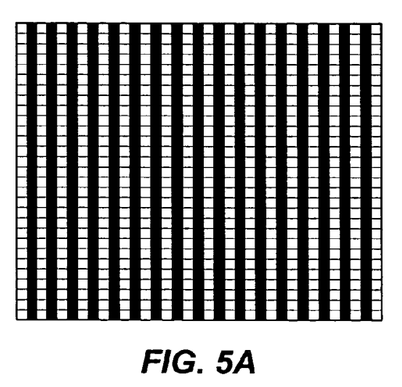
FIGS. 5A-5D illustrate several different test patterns that can be used among the techniques of the present invention.
Figure 5B:
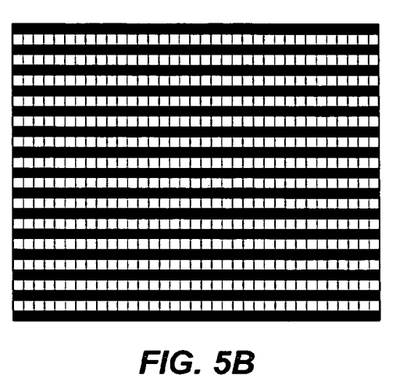
Figure 5C:
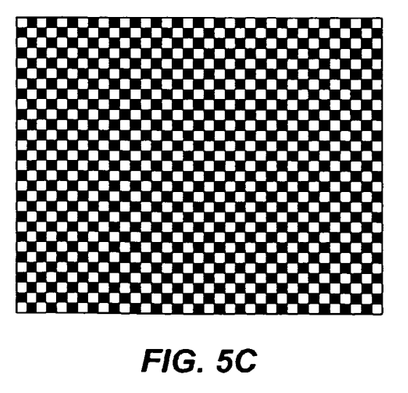
Figure 5D:
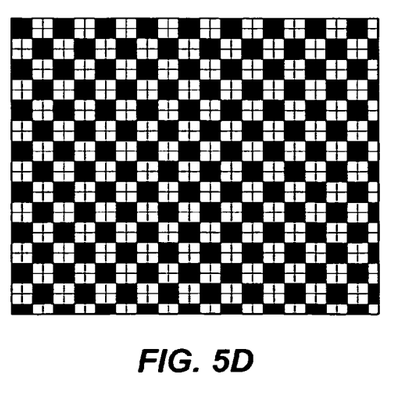

By analyzing image 350 and characterizing the effect of the distortion (whatever its source), new directions can be selected for the parallel oblique projections rendered as part of the process of holographic stereograph production. FIG. 4 illustrates a simple characterization example. Projection plane 400 (here viewed as if it extends normal to the page) includes a center point 410. View point 420 is located a distance d from center point 410. Portions of projection plane 400 correspond to individual pixels, such as pixel 430. The center point 440 of pixel 430 is located a distance x from center point 410. Thus, the angle α defines a shear angle from which a parallel oblique projection of a computer graphics scene can rendered. When such an image is rendered, each of the image's pixels is used in the same corresponding pixel location for each of a number of different hogels, where each of the pixels in the parallel oblique rendered image appears in only one hogel. As noted above, previous techniques assumed that the shear angles to be used for oblique rendering were simply defined by the geometric relationship between the recording system's SLM and the recording surface. However, with test images such as image 350, proper shear angles can be determined empirically so that rendered images result in holograms that are less likely to be distorted.

A variety of different characterization techniques and techniques for using the resultant information can be implemented. For example, images such as image 350 can be analyzed to fit the distortion to a particular polynomial that describes the distortion. That polynomial can, in turn, be used to select shear angles for rendering, or to modify a base set of shear angles. For example, a default set of shear angles might be defined, as discussed above, by the geometric relationship of a hologram recording system's SLM to its recording surface. That default set of angles could then be modified based on the characterization of image 350. In one example, modification of the default set of angles is made "on-the-fly" by calculating a new angle based on the default angle and a correction expression, e.g., a polynomial, a constant value, or the like. In another example, a lookup table is generated having angular values to be used, where each angular value corresponds to an SLM pixel. In still another example, each pixel of image 350 is separately characterized and a corresponding shear angle determined. In this way, several different types of distortion can be accounted for simultaneously. Various combinations of these techniques can also be implemented, but the common goal of each variation is to determine the actual angle (or as close to the actual angle as can be determined) of an image pixel produced by a particular SLM pixel.

In another example, the test pattern characterization process can be automated. The resulting image of the test pattern can be electronically captured, e.g., photographed and/or scanned, projected onto an array of photodetectors, etc., and then analyzed by appropriate software to determine desired rendering shear angles or corrections thereto. Such a system could be self calibrating, that is it could select one or more appropriate test patterns, record hogels based on the patterns, characterize the images produced by the hogels, and use the characterization information accordingly.

FIGS. 5A-5D illustrated several different test pattern images that can be used to characterize a hologram recording system. For example, patterns such as those shown in FIGS. 5A and 5B might be useful for hologram production systems producing holograms having parallax in only one dimension. Test patterns such as those in FIGS. 5C and 5D might be useful for characterizing multiple distortive effects. In other examples, test patterns having random patterns might be useful. In still other examples, a very simple test pattern, e.g., a single or small group of pixels might be used. Such test patterns might only provide desired information for a small portion of the image, but a series of such test patterns where each pattern is slightly different from the last can provide adequate correction information and may facilitate characterization. One example of such a scheme is a series of test patterns where each pattern uses only one activated pixel and each test pattern has a different pixel activated so that all possible pixels are eventually used as a test pattern. Other known test pattern schemes, e.g., concentric circles, features having increasing size or resolution, etc. can also be used. In general, any suitable test pattern can be used.

It should be noted that for the purposes of selecting directions for rendering parallel oblique projections, one need not be limited to the directions defined by the SLM used in the hologram recorder as a starting point. For example, one could render images corresponding to more than the number of directions the hologram recorder is capable of recording, effective over-sampling so that additional image processing techniques can be used. Similarly, one can render images corresponding to a number of directions smaller than the number of directions the hologram recorder is capable of recording. For example, instead of defining one direction based on the line connecting the center of one LCD pixel with the center of the hogel, a direction defined by the line between the center of a set of four adjacent pixels and the center of the hogel can be used. Thus, it may be desirable to use test pattern images having a resolution differing from the resolution of images used for recording holograms.

Figure 6:
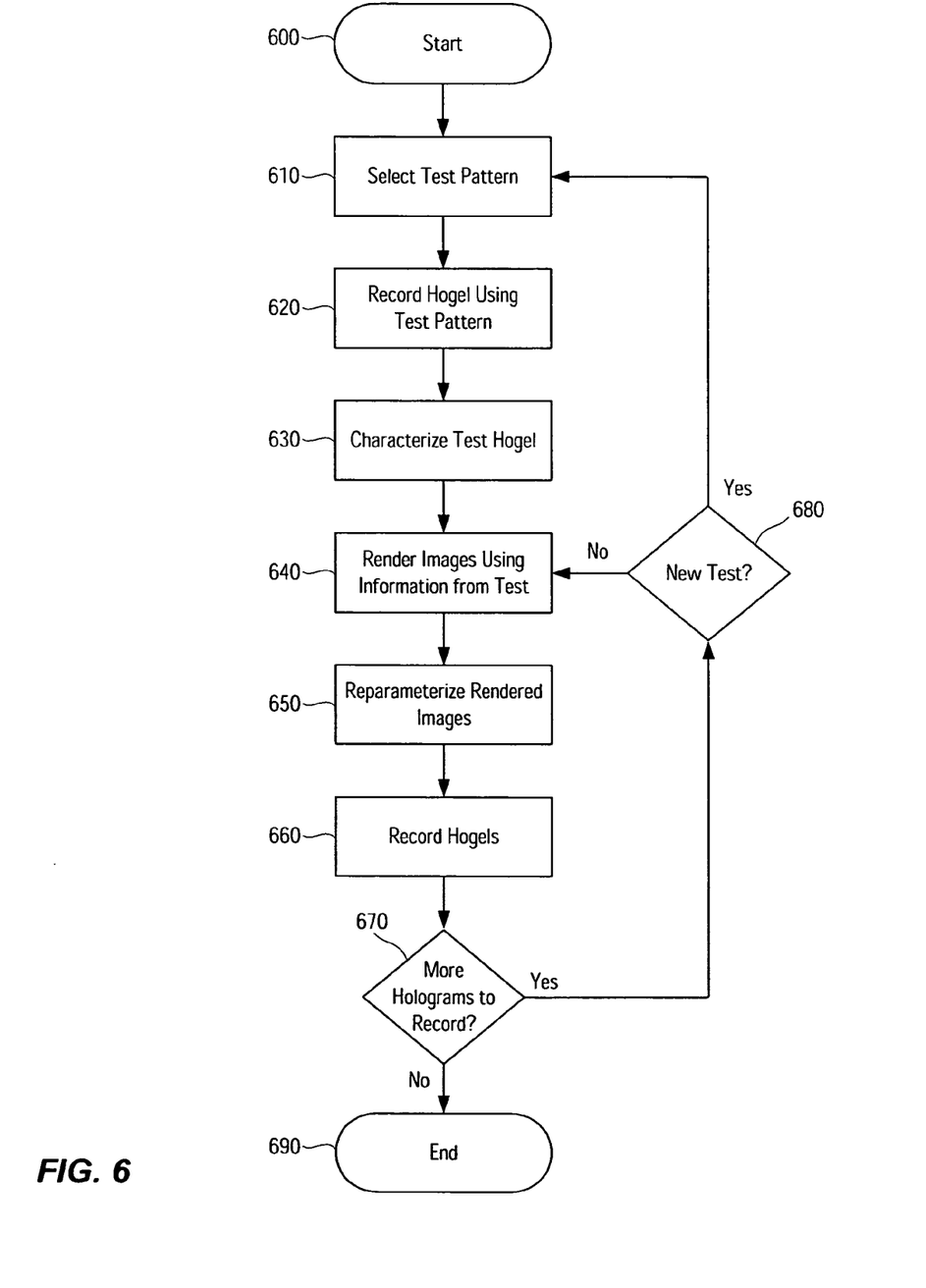
FIG. 6 is a flow chart illustrating techniques of the present invention.

FIG. 6 is a flow chart illustrating a hologram recording process including test pattern characterization. Process 600 begins with selection of an appropriate test pattern 610. As noted above, a variety of different test patterns can be used. Selection of any particular test pattern may depend on the source of expected distortion, e.g., dimensional changes in the holographic recording material, lighting parameter, optics in the recording system, etc. Suitable test patterns might also include color images, variations in color, and images like those that will ultimately be rendered and recorded. Additionally, certain test patterns might be selected because of the ease with which they can subsequently be characterized.

Once an appropriate test pattern is selected, one or more hogels is recorded (620) using the test pattern image. It is preferable that any test pattern hogel be recorded under recording system conditions that approximate the recording system conditions to be used for normal hologram production. However, if the effects of certain aspects of the recording process are already well understood or known not to affect the resulting image, the test pattern hogel can be recorded under different conditions. For example, if it is known that changes in the angle of the reference beam will not affect the test, e.g., the hologram will ultimately be illuminated with collimated light, a single test hogel might be recorded instead of recording several different hogels, each using a different reference beam angle.

Once a suitable hogel is created, the image created by that hogel is characterized in step 630. As part of the characterization process, hologram play-back conditions can be carefully selected. For example, it may be desirable to characterize any distortion associated with a particular illumination scheme to be used. In general, illumination of the test hogel during the characterization process should approximate the type of illumination to be used to display the finished hologram created by the hologram recording system. As noted above, a variety of different techniques can be used to characterize the image produced by the test hogel. The end result of the characterization is sufficient information to select (or assist in the selection of) shear angles for parallel oblique projection rendering.

Image rendering utilizing information derived from the test hogel occurs in 640. A number of different rendering techniques can be used, as is well known in the art. Next the rendered images are reparameterized (650) to form hogel images. Each hogel of the resulting holographic stereogram is recorded in step 660 using the appropriate hogel image. With no more holograms to record, as determined at 670, operation terminates 690. If additional holograms are to be recorded, step 680 determines whether another test pattern sequence should be executed. In many cases, it may be sufficient to process and characterize only one test pattern for a variety of different hologram production operations and/or systems. Alternately, it may be desirable to "recalibrate" the recording system more frequently. Thus, if no new test is desired, operation transitions to 640. If a new test is desired, operation transitions to 610.

Those having ordinary skill in the art will readily recognize that certain steps illustrated in FIG. 6 can be eliminated or taken in an alternate order. Moreover, the method described in FIG. 6 is typically implemented as one or more software programs for a computer system, that is encoded in a computer readable medium as instructions executable on one or more processors. The computer readable medium can be any one of an electronic storage medium, a magnetic storage medium, an optical storage medium, and a communications medium conveying signals encoding the instructions. Separate instances of these programs can be executed on separate computer systems in keeping with the multi-process methods described above.

Figure 7:
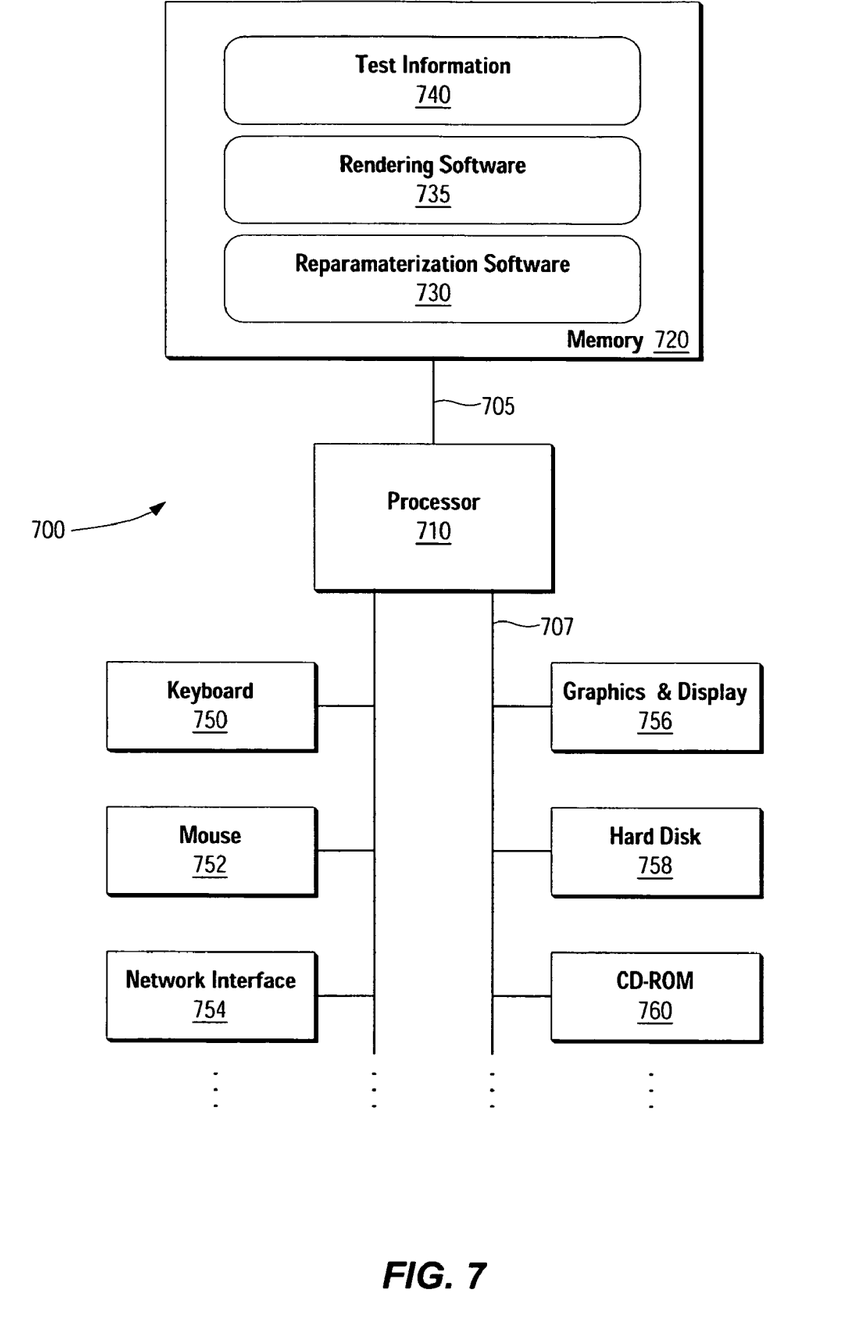
FIG. 7 is a block diagram of a computer system for implementing the techniques of the present invention.

FIG. 7 illustrates a block diagram of a computer system 700 for implementing the techniques of the present invention. Computer system 700 includes a processor 710 and a memory 720 coupled together by communications bus 705. Processor 710 can be a single processor or a number of individual processors working together. Memory 720 is typically random access memory (RAM), or some other dynamic storage device, and is capable of storing instructions to be executed by the processor, e.g., reparameterization software 730 and rendering software 735, and information used by the instructions, such as test information 740. Memory 720 is also used for storing temporary variables or other intermediate information during the execution of instructions by the processor 710.

Other examples of software stored in memory 720 can include software for automating some or all of the test hogel characterization process. Those having ordinary skill in the art will readily recognize that the techniques and methods discussed in this application can be implemented in software using a variety of computer languages, including, for example, traditional computer languages such as assembly language, Pascal, and C; object oriented languages such as C++ and Java; and scripting languages such as Perl and Tcl/Tk. Test information 740 is one example of information that can be used by software such as rendering software 735 as part of the image processing process used in creating holographic stereograms. Additionally, software 730 and/or 735 can be provided to the computer system via a variety of computer readable media including electronic media (e.g., flash memory), magnetic storage media (e.g., hard disk 758, a floppy disk, etc.), optical storage media (e.g., CD-ROM 760), and communications media conveying signals encoding the instructions (e.g., via a network coupled to network interface 754).

Computer system 700 also includes devices such as keyboard 750, mouse 752, network interface 754, graphics & display 756, hard disk 758, and CD-ROM 760, all of which are coupled to processor 710 by communications bus 707. It will be apparent to those having ordinary skill in the art that computer system 700 can also include numerous elements not shown in the figure, such as additional storage devices, communications devices, input devices, and output devices, as illustrated by the ellipsis shown.

Figure 8:
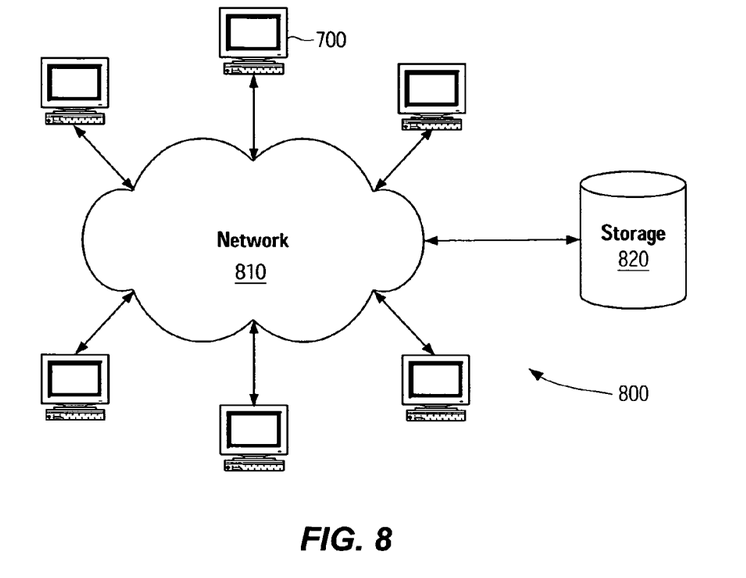
FIG. 8 is a block diagram of a cluster of computer systems for implementing the tools and techniques of the present invention.

FIG. 8 is a block diagram of a cluster 800 of computer systems for implementing the tools and techniques of the present invention. Each of the computer systems or hosts in the cluster is typically like computer system 700 of FIG. 7. The hosts of cluster 800 communicate with each other, and optional storage 820 via network 810. Many different hardware and software schemes for communication via network 810 (e.g., Ethernet, Fibre Channel, Infiniband, etc.) are well known to those having ordinary skill in the art. Additionally, each of the hosts in cluster 800 need not have all of the elements present in computer system 700. For example, many cluster configuration would not require that all of the hosts have keyboard 750, mouse 752, graphics and display 756, or CD-ROM 760.

Figure 9:
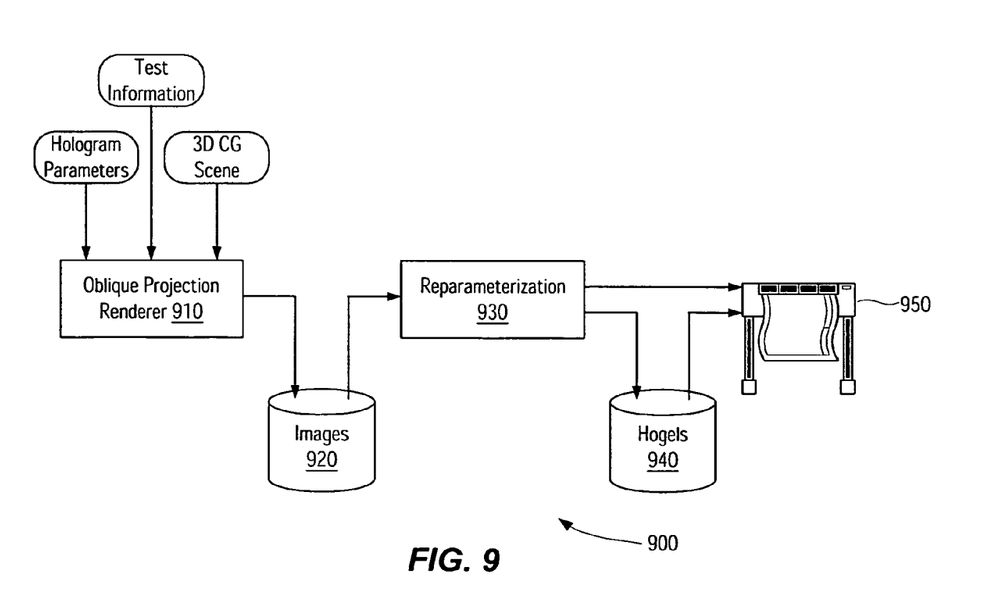
FIG. 9 illustrates a hologram production system.

FIG. 9 illustrates hologram production system 900. In contrast to so-called "on-line" production systems (where the hogel images to be recorded in the holographic recording material are rendered, used, and discarded as the hologram is being recorded) hologram production system 900 is often referred to as an "off-line" production system. This is because the images are first rendered by renderer 910 (or alternately captured by a camera) based on hologram parameter information (e.g., hologram size, hogel size, resolution, field of view, and position of a hologram illuminating light source), 3D computer graphics scene information and test information, then optionally stored, and finally recorded.

The 3D computer graphics scene is based on a 3D computer graphics model which may be composed using standard 3D graphics tools (e.g. a 3D modeling tool such as Discreet's 3D Studio Max, or Maya from Alias|Wavefront, a division of Silicon Graphics Limited) and techniques. Additional software can also be used to manipulate the model and support the definition and adjustment of multiple hologram parameters. In the renderer 910, images are generated using parallel oblique projections, one per discrete direction recorded by the hologram recorder. This is in contrast to on-line schemes using other models where the image for an entire hogel (i.e. using all discrete directions recorded by the hologram recorder) is rendered at one time.

In general, any computer graphics rendering technique can be used in conjunction with the techniques described herein. Thus, renderer 910 can be implemented using scan-conversion or scan-line conversion (e.g., as implemented in the OpenGL™ graphics library), ray tracing techniques, and even image-based rendering techniques. Moreover, rendering hardware and/or software may become sufficiently fast and storage-dense in the future so as to obviate the need for separate storage 920 and/or storage 940.

The rendered images are saved in storage 920, which can be any type of suitable data storage device, including magnetic, electronic, and optical storage devices. Next the images are reparameterized (930) and processed into hogel images which are either stored (940) or sent directly to hologram recorder 950. In general, a hologram is recorded by recording interference patterns in a light sensitive holographic recording material. A simple method exposes the material with coherent laser light generated by a red, a green and a blue laser. The laser beams are combined into two sets, the object beam(s) and the reference beam(s), both containing all three color components. The object beams are then modulated in amplitude using a spatial light modulator, typically an LCD screen or a digital micromirror array, using the rendered images. The modulated object beam is then combined with the reference beam in the recording material to record a single hogel's interference pattern.

It should be noted that although the systems and techniques disclosed in this application emphasize their applicability to the production of full parallax holographic stereograms, those having ordinary skill in the art will recognize that there are differing degrees to which a hologram might display different views of a 3D scene in the vertical dimension. Thus, full-parallax holographic stereograms generally include any holographic stereogram that displays some image variation in the vertical dimension. Additionally, the systems and techniques disclosed in this application can be applied to the production of HPO holographic stereograms.

The systems and techniques disclosed in this application can also be applied to a variety of different holographic display technologies. In general, any display technology that utilizes hologram elements can utilize the systems and techniques described above, and such display technology need not be static. For example, holo-video displays and displays using updatable holographic recording materials can benefit from the disclosed systems and techniques. These techniques can also be applied to non-holographic displays such as lenticular and raster-barrier displays. The view recorded or displayed behind an individual lenticule or aperture corresponds to a hogel view.

Although the present invention has been described with respect to a specific preferred embodiment thereof, various changes and modifications may be suggested to one skilled in the art and it is intended that the present invention encompass such changes and modifications fall within the scope of the appended claims.

What is claimed is:

1. A method comprising:
   selecting at least one direction in a computer graphics model, the at least one direction being based on information derived from a test image; and
   rendering at least one computer graphics image, wherein the computer graphics image is a parallel projection of a computer graphics scene and the parallel projection is determined by the at least one direction.

2. The method of claim 1 further comprising:
   characterizing the test image to produce the information derived from the test image, the information derived from the test image including at least one of an angle or a correction expression.

3. The method of claim 2 wherein the characterizing further comprises:
   fitting a curve to at least a portion of the test image.

4. The method of claim 2 wherein the characterizing further comprises:
   measuring at least one angle between a portion of the test image and a normal to a plane of the test image.

5. The method of claim 1 wherein the information derived from the test image includes a plurality of values, each of the plurality of values corresponding to a direction associated with at least one pixel in a spatial light modulator.

6. The method of claim 1 further comprising:
   providing a test pattern image;
   recording a hologram of the test pattern image; and
   illuminating the hologram of the test pattern image to produce the test image.

7. The method of claim 6 further comprising:
   electronically capturing the test image.

8. The method of claim 1 further comprising:
   recording a hologram of the at least one computer graphics image.

9. The method of claim 1 wherein the rendering further comprises at least one of scan-line conversion, ray tracing, or image-based rendering.

10. The method of claim 1 wherein the rendering further comprises
rendering a parallel oblique projection of the computer graphics scene.

11. The method of claim 1 wherein the at least one computer graphics image includes a plurality of computer graphics images and the at least one direction includes a plurality of directions, each of the plurality of computer graphics images being a parallel oblique projection of the computer graphics scene, and each of the plurality of computer graphics images being determined by a respective one of the plurality of directions.

12. The method of claim 11 wherein the plurality of computer graphics images includes at least one of horizontal parallax only (HPO) data or full parallax data.

13. The method of claim 1 encoded in a computer readable medium as instructions executable on a processor, the computer readable medium being one of an electronic storage medium, a magnetic storage medium, an optical storage medium, and a communications medium conveying signals encoding the instructions.

14. An apparatus comprising:
a processor;
a storage medium coupled to the processor and operable to store at least one computer graphics image;
a memory coupled to the processor; and
a computer program for rendering the at least one computer graphics image, wherein the computer graphics image is a parallel projection of a computer graphics scene and the computer program determines the parallel projection by using at least one direction in a computer graphics model, the at least one direction being based on information derived from a test image.

15. The apparatus of claim 14 wherein the information derived from the test image is stored in at least one of the memory or the storage medium, and wherein the information derived from the test image includes at least one of an angle or a correction expression.

16. The apparatus of claim 14 further comprising:
a second computer program operable to characterize the test image to produce the information derived from the test image.

17. The apparatus of claim 14 wherein the information derived from the test image includes a plurality of values, each of the plurality of values corresponding to a direction associated with at least one pixel in a spatial light modulator.

18. The apparatus of claim 14 wherein the computer program for rendering performs at least one of scan-line conversion, ray tracing, or image-based rendering.

19. The apparatus of claim 14 wherein the computer graphics image is a parallel oblique projection of the computer graphics scene.

20. The apparatus of claim 14 wherein the at least one computer graphics image includes a plurality of computer graphics images and the at least one direction includes a plurality of directions, each of the plurality of computer graphics images being a parallel oblique projection of the computer graphics scene, and each of the plurality of computer graphics images being determined by a respective one of the plurality of directions.

21. The apparatus of claim 14 wherein the computer graphics image includes at least one of horizontal parallax only (HPO) data or full parallax data.

22. A computer program product comprising:
a computer-readable storage medium; and
instructions stored on the computer-readable storage medium and executable by a processor to perform a method that comprises:
selecting at least one direction in a computer graphics model, the at least one direction being based on information derived from a test image; and
rendering at least one computer graphics image, wherein the computer graphics image is a parallel projection of a computer graphics scene and the parallel projection is determined by the at least one direction.

* * * * *